United States Patent
Lee et al.

(10) Patent No.: US 12,099,916 B2
(45) Date of Patent: Sep. 24, 2024

(54) DATA PROCESSING METHOD AND APPARATUS USING NEURAL NETWORK AND ELECTRONIC DEVICE INCLUDING THE SAME

(71) Applicants: SAMSUNG ELECTRONICS CO., LTD., Suwon-si (KR); Industry-Academic Cooperation Foundation, Yonsei University, Seoul (KR)

(72) Inventors: Yeongsik Lee, Seoul (KR); Youngsok Kim, Seoul (KR); Hanjun Kim, Seoul (KR); Sungjun Cho, Seoul (KR); Seonyeong Heo, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 833 days.

(21) Appl. No.: 17/177,909

(22) Filed: Feb. 17, 2021

(65) Prior Publication Data

US 2022/0180150 A1 Jun. 9, 2022

(30) Foreign Application Priority Data

Dec. 9, 2020 (KR) .......................... 10-2020-0171656

(51) Int. Cl.
*G06N 3/04* (2023.01)
*G06N 3/049* (2023.01)
(Continued)

(52) U.S. Cl.
CPC ............. *G06N 3/049* (2013.01); *G06N 3/084* (2013.01); *G06V 10/255* (2022.01); *G06V 10/82* (2022.01)

(58) Field of Classification Search
None
See application file for complete search history.

(56) References Cited

U.S. PATENT DOCUMENTS

| 9,904,852 B2 | 2/2018 | Divakaran et al. |
| 10,402,995 B2 | 9/2019 | Kwant et al. |

(Continued)

FOREIGN PATENT DOCUMENTS

| CN | 110929867 A | 3/2020 |
| KR | 10-1787611 B1 | 10/2017 |

(Continued)

OTHER PUBLICATIONS

Heo et al ("Real-Time Object Detection System with Multi-Path Neural Networks" Apr. 2020) (Year: 2020).*

(Continued)

*Primary Examiner* — Lut Wong
(74) *Attorney, Agent, or Firm* — NSIP Law

(57) ABSTRACT

A data processing method and apparatus using a neural network, and an electronic device including the data processing apparatus. The data processing method includes identifying an operator that selects one of a plurality of execution paths for a portion of the neural network while sequentially executing layers included in the neural network, selecting a specific execution path, from among the plurality of execution paths, based on a remaining time that is left for an inference of the neural network, and obtaining a result of the inference of the neural network through the specific execution path.

23 Claims, 15 Drawing Sheets

(51) Int. Cl.
*G06N 3/084* (2023.01)
*G06V 10/20* (2022.01)
*G06V 10/82* (2022.01)

(56) References Cited

U.S. PATENT DOCUMENTS

2018/0300610 A1 10/2018 Pye et al.
2019/0050754 A1 2/2019 Assem Aly Salama et al.
2019/0114538 A1* 4/2019 Ng .......................... G06N 3/08

FOREIGN PATENT DOCUMENTS

KR 10-2020-0024433 A 3/2020
KR 10-2020-0091790 A 7/2020
WO WO 2020/043545 A1 3/2020
WO WO 2020/072205 A1 4/2020
WO WO 2020/099680 A2 5/2020

OTHER PUBLICATIONS

Xiang et al ("Pipelined Data-Parallel CPU/GPU Scheduling for Multi-DNN Real-Time Inference" Dec. 3-6, 2019) (Year: 2019).*
Bateni et al ("ApNet: Approximation-aware Real-Time Neural Network" 2018) (Year: 2018).*
Seonyeong Heo et al., "Real-Time Object Detection System with Multi-Path Neural Networks", IEEE Symposium, Jun. 10, 2020 (14 pages in English).
Seonyeong Heo et al., "Real-Time Object Detection System With Multi-Path Neural Networks", Academic Association in Korea, Jul. 3, 2020 (49 pages in English).
Seonyeong Heo et al., "Real-Time Object Detection System With Multi-Path Neural Networks", Academic Association in Korea, Apr. 21-24, 2020 (49 pages in English).

* cited by examiner

DATA PROCESSING METHOD AND APPARATUS USING NEURAL NETWORK AND ELECTRONIC DEVICE INCLUDING THE SAME

CROSS-REFERENCE TO RELATED APPLICATIONS

This application claims the benefit under 35 USC § 119(a) of Korean Patent Application No. 10-2020-0171656 filed on Dec. 9, 2020, in the Korean Intellectual Property Office, the entire disclosure of which is incorporated herein by reference for all purposes.

BACKGROUND

1. Field

The following description relates to a data processing method and apparatus using a neural network, and an electronic device including the data processing apparatus.

2. Description of Related Art

A neural network-based system may have a consistent time used for an inference by allowing a neural network to follow the same execution path all the time. Thus, research has been conducted on various methods for a real-time inference including a method using a small-size neural network and a method of executing a neural network with high-performance hardware.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a data processing method using a neural network to be executed by a processor includes identifying an operator that selects one of a plurality of execution paths for a portion of the neural network while sequentially executing layers included in the neural network, selecting a specific execution path, from among the plurality of execution paths, based on a remaining time that is left for an inference of the neural network, and obtaining a result of the inference of the neural network through the specific execution path.

The selecting may include selecting the specific execution path based on a result of comparing, to the remaining time, a minimum execution time of a remaining portion of the neural network after the operator.

The remaining time may include a remaining time that is left to a deadline or a remaining time that is left to an intermediate reference time. The remaining time that is left to the deadline may be determined based on the deadline and an elapsed time. The deadline may be a time by which the inference of the neural network needs to be completed, and the elapsed time may be a time elapsed after the inference of the neural network is started until when the operator is executed. The remaining time that is left to the intermediate reference time may be determined based on the intermediate reference time and the elapsed time. The intermediate reference time may be set for a portion of inference operations performed in the neural network.

The operator may be a skip operator that determines whether to execute a subnet including one or more layers. The selecting may then include selecting the specific execution path from among a path for executing the subnet and a path for skipping the subnet.

When a sum of an execution time of the subnet and a minimum execution time of the neural network after the subnet is less than or equal to the remaining time, the selecting may include selecting the path for executing the subnet.

The neural network may include iterative blocks each including one or more layers, and the skip operator may be arranged between the blocks.

The skip operator may be arranged between blocks having a same input size.

The operator may be a switch operator that selects a subnet to be executed from among a plurality of subnets each including one or more layers. The selecting may then include selecting the specific execution paths from among paths that respectively execute the subnets.

The selecting may include selecting a path for executing a subnet having a greatest execution time among subnets for which a sum of an execution time of the respective subnet and a minimum execution time after a corresponding subnet in the neural network is less than or equal to the remaining time.

The selecting may include selecting the path for executing the subnet having the greatest execution time that is executable within the remaining time by determining whether a remaining portion of the neural networks including subnets in sequential order of a greatest execution time among the subnets is executable within the remaining time.

The neural network may be a network that detects an object in an image.

The data processing method may further include extracting, as region proposals, one or more regions from which an object is predicted to be detected in the image, and selecting n region proposals from among the extracted regions based on the remaining time. Here, n is a natural number greater than 0 and less than a total number of the extracted region proposals.

In addition, n may be determined based on a minimum time for detecting and classifying an object in each of the n region proposals and on the remaining time.

The deadline set for the inference of the neural network may be set based on an environment in which the neural network is executed.

The neural network may be trained based on backpropagation through a corresponding subnet without skipping in the skip operator included in the neural network and on backpropagation through a corresponding plurality of subnets without switching of the switch operator included in the neural network, trained based on backpropagation through which skipping is randomly performed in the skip operator and on backpropagation through a corresponding plurality of subnets without switching of the switch operator, trained based on backpropagation through a corresponding subnet without skipping in the skip operator and on backpropagation through which switching of the switch operator is randomly performed, or trained based on backpropagation through which skipping is randomly performed in the skip operator and on backpropagation through which switching of the switch operator is randomly performed.

In another general aspect, a data processing apparatus using a neural network includes at least one processor. The processor may identify an operator that selects one of a plurality of execution paths for a portion of the neural network while sequentially executing layers included in the neural network, select a specific execution path, from among the plurality of execution paths based on a remaining time for an inference of the neural network, and obtain a result of the inference of the neural network through the specific execution path.

In still another general aspect, an electronic device includes a host processor configured to transmit, to an accelerator, an instruction for a model to be executed in the accelerator in response to a request for executing the model in the accelerator being received, and the accelerator configured to execute the model based on the instruction. The accelerator may identify an operator that selects one of a plurality of execution paths for a portion of the model while sequentially executing layers included in the model, select a specific execution path, from among the plurality of execution paths, based on a remaining time for an inference of the model, and obtain a result of the inference of the model through the specific execution path.

In another general aspect, a processor-implemented method includes determining an amount of time remaining until an inference of a neural network; selecting a specific execution path of the neural network, from among a first execution path of the neural network that includes execution of a specific subnet and a second execution path of the neural network that excludes execution of the specific subnet, based on the amount of time remaining; and obtaining a result of the inference of the neural network through the specific execution path.

The method may include determining an amount of time required to execute the specific subnet; in a case in which the amount of time required to execute the specific subnet is greater than the amount of time remaining, selecting the second execution path as the specific execution path; and in a case in which the amount of time required to execute the specific subnet is less than or equal to the amount of time remaining, selecting the first execution path as the specific execution path.

Other features and aspects will be apparent from the following detailed description, the drawings, and the claims.

Figure 1:
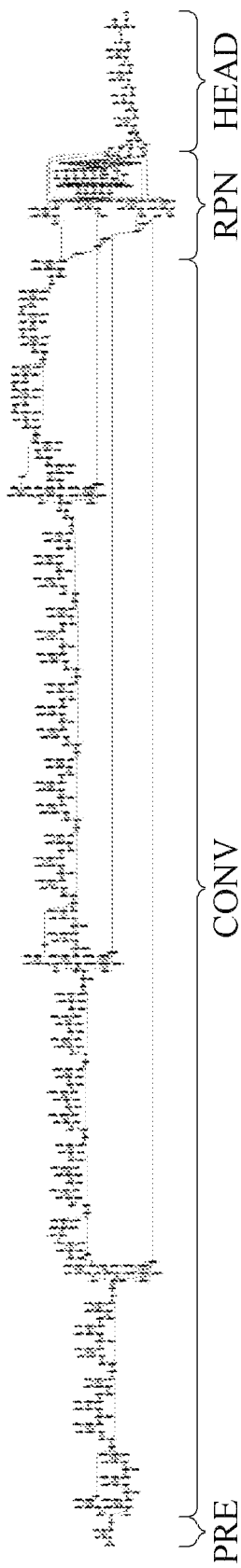
FIGS. 1, 2, and 3 illustrate an example of a neural network to which a multi-path operator is applied.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 2:
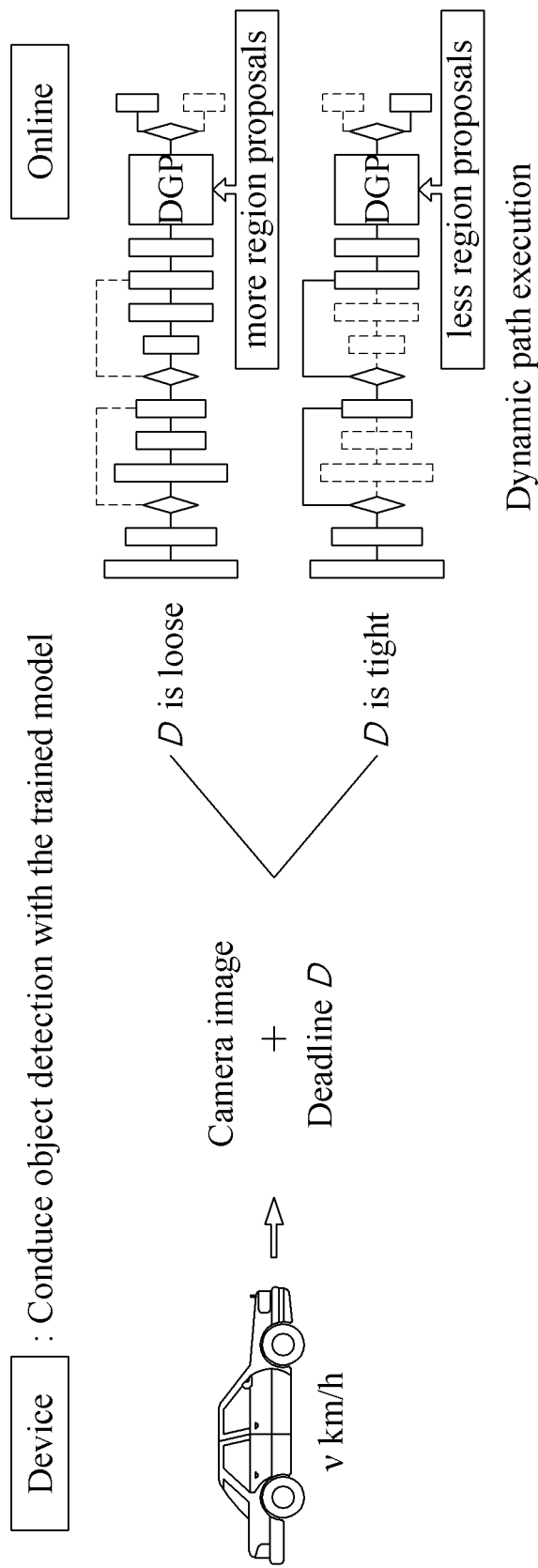
Figure 3:
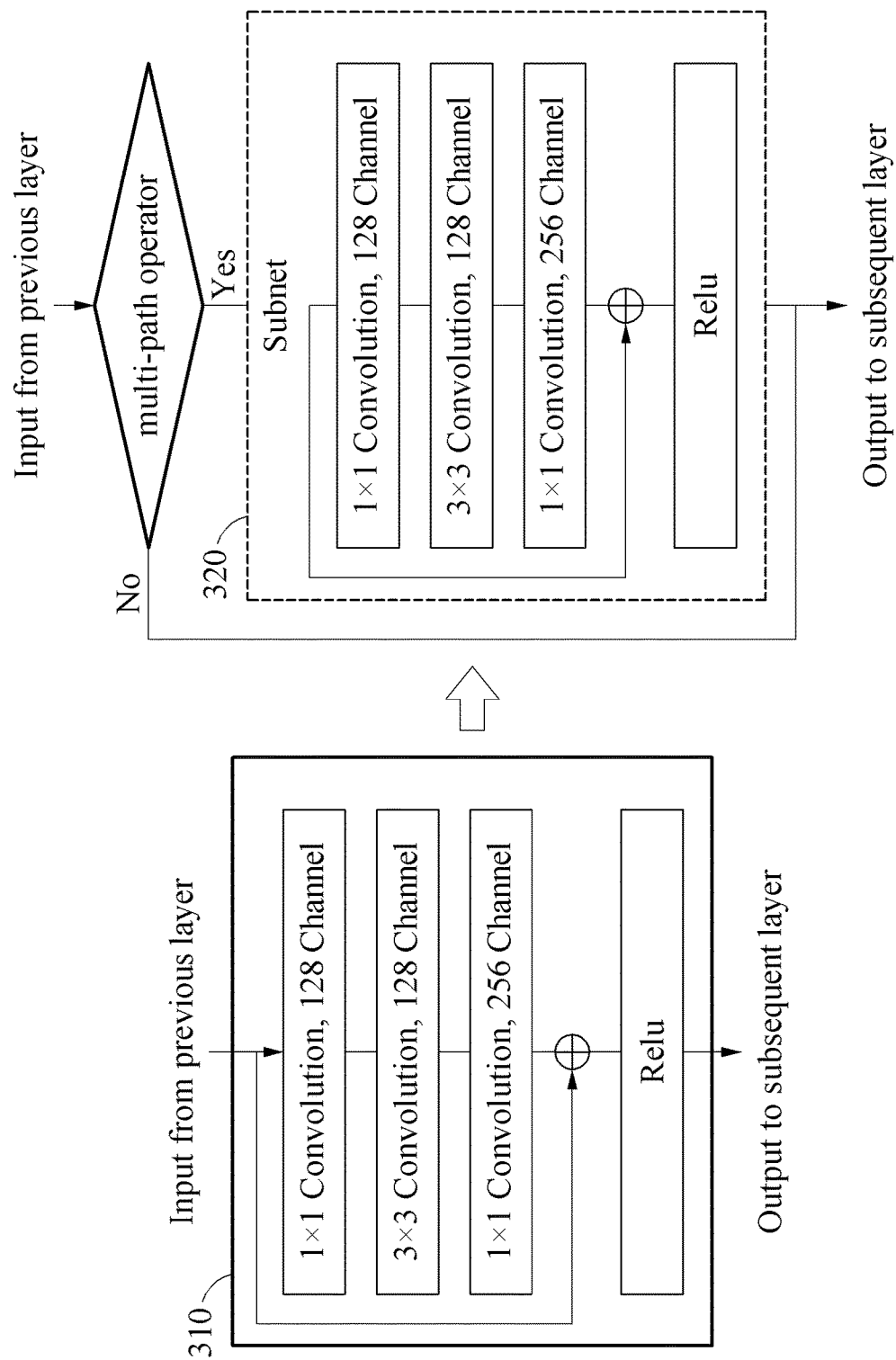

FIGS. 1 through 3 illustrate an example of a neural network to which a multi-path operator is applied.

A neural network may include a plurality of layers. The neural network may include an input layer, a plurality of hidden layers, and an output layer. Each of the layers may include a plurality of nodes each referred to as an artificial neuron. Each of the nodes may indicate a computation unit having at least one input and output, and the nodes may be connected to one another. A weight may be set for a connection between nodes and be adjusted or changed. The weight may increase, decrease, or maintain a related data value, thereby determining an influence of the data value on a final result. To each node included in the output layer, weighted inputs of nodes included in a previous layer may be input. A process in which weighted data is input from a layer to a subsequent layer of the layer may be referred to as propagation. The neural network including such a plurality of hidden layers may be referred to as a deep neural network (DNN).

A data inference may be performed through the neural network. The data inference may include, for example, pattern recognition (e.g., object recognition, face identification, etc.), sequence recognition (e.g., speech, gesture, and handwritten texture recognition, machine translation, machine interpretation, etc.), control (e.g., vehicle control, processor control, etc.), recommendation services, decision making, medical examination or diagnosis, financial applications, data mining, and the like. Hereinafter, an example of object detection through a neural network will be described for the convenience of description.

Referring to FIG. 1, a neural network for object detection may be a two-stage network that includes a region proposal stage for proposing a region that may potentially include a valid object in an image, and a classification stage for classifying the valid object from the proposed region. For example, the neural network for object detection may be a fast region-based convolutional neural network (R-CNN) and include four phases: PRE, CONV, RPN, and HEAD.

PRE may be a preprocessing phase that applies a basic routine such as scaling and cropping to a given image to match the size of the image to one that is predicted by a remaining DNN. CONV may include a deep convolutional network (e.g., residual neural network [ResNet]) for extracting high-level features of a potential object to be used in the RPN and HEAD phases. RPN may include a region proposal network that determines a region proposal indicating a certain region in which an object is predicted to be present in a given image, based on high-level features from the convolutional network. HEAD may be a post-processing phase that finally classifies an object in at least one region proposal determined in the RPN phase based on high-level features from the convolutional network.

Referring to FIG. 2, a neural network that controls an autonomous (or self-driving) vehicle may obtain various sets of information associated with, for example, recognition of lanes, traffic lights, nearby vehicles, and pedestrians, for traveling, through a captured image of a front side of the vehicle, and control an operation of the vehicle based on the obtained sets of information. However, there may be an unpredictable situation in an actual traveling or driving environment, and thus the vehicle may need to be controlled according to a situation through fast decision making. However, when the neural network has the same execution path all the time, the amount of time used for an inference may be consistently the same, and thus it may not be easy to effectively respond to an environment that changes in real time. For example, when the autonomous vehicle travels fast, determining a probability of colliding with an object in front and decision making for controlling an operation of the vehicle may need to be performed fast. Thus, a time constraint required for object detection may vary according to the traveling speed of the autonomous vehicle. To obtain an inference result more stably and control an operation accordingly, a model of which an inference time is adaptively controllable based on a time constraint that varies based on an execution time may be used.

For example, an execution path of the neural network may be adaptively determined based on whether a deadline D, which corresponds to a time taken for the vehicle traveling at a speed of v km/h to reach an object positioned in front of the vehicle, is tight or loose. For example, in a case in which the vehicle is fast in speed and thus the deadline D is tight, an inference result of the neural network may be obtained fast to prevent a collision with the object in front. In this example, by skipping some layers of the neural network without executing them, switching some layers of the neural network to simpler layers to execute the simpler layers, or making fewer region proposals for regions from which an object is to be detected, it is possible to effectively reduce an inference time of the neural network and allow an inference to be completed within a time constraint. Conversely, in a case in which the vehicle is slow in speed and the deadline D is loose, by not skipping some layers of the neural network, by not switching some layers of the neural network to simpler layers, or by making more region proposals for regions from which an object is to be detected, it is possible to effectively prevent a collision while obtaining a highly accurate inference result due to a sufficient inference time. As described above, by dynamically changing an execution path of a neural network according to a time constraint determined based on an execution environment including, for example, a speed of a vehicle, it is possible to obtain an optimal inference result within the time constraint.

FIG. 3 illustrates an example of converting a single path to multiple paths by applying an operator to a neural network. A network that dynamically changes an execution path based on a time constraint may be referred to herein as a multi-path neural network. The multi-path neural network may achieve a real-time inference by obtaining an inference result within a time constraint that changes according to an execution environment. A multi-path operator included in the multi-path neural network may be an operator that selects one from among a plurality of execution paths based on a given time constraint. The multi-path operator may calculate a remaining time based on a deadline determined based on an execution environment and on an elapsed time from when an inference of the neural network is started to when the operator is reached, and adaptively select an execution path based on a result of the calculating.

Referring to FIG. 3, a residual block 310 included in a neural network to which a multi-path operator is not applied may perform data processing based an input from a previous layer and transmit an output to a subsequent layer. That is, the residual block 310 may be executed in any execution environment. In contrast, a residual block 320 included in a neural network to which a multi-path operator is applied may be executed or skipped according to a constraint based on an execution environment. When the constraint based on the execution environment is satisfied even by executing the residual block 320, the multi-path operator may select a path that executes the residual block 320. However, when the constraint is not satisfied by executing the residual block 320, the multi-path operator may select a path that does not execute the residual block 320. A portion of the network that is to be executed or not to be executed based on what is to be selected by the multi-path operator may be referred to herein as a subnet. That is, based on whether a condition of the multi-path operator is satisfied or not, whether to execute the residual block 320 may be determined. The condition may be one that satisfies a constraint that is based on an execution environment.

The multi-path neural network may be designed to satisfy the following two constraints. A first constraint is a deadline constraint. A maximum execution time $t_{max}^T$ of the multi-path neural network may be less than or equal to a maximum relative deadline $D_{max}$, which may be represented as $t_{max}^T \leq D_{max}$. A second constraint is a memory constraint. A total memory needed for the multi-path neural network may be less than or equal to a total memory $M_{max}$ of a device that executes the multi-path neural network, which may be represented as $$\sum_{i=1}^{n} M_i \leq M_{max}.$$

Here, n denotes the number of layers included in the network, and $M_i$ denotes a memory capacity needed for each of the layers.

Thus, by adding a multi-path operator to a neural network having a single path to expand the neural network to have multiple paths, it is possible to achieve a real-time inference with less cost while using a structure of the neural network having the single path. The multi-path operator may include a skip operator, a switch operator, and a dynamic generate proposal operator, which will be all described hereinafter with reference to the accompanying drawings.

Figure 4:
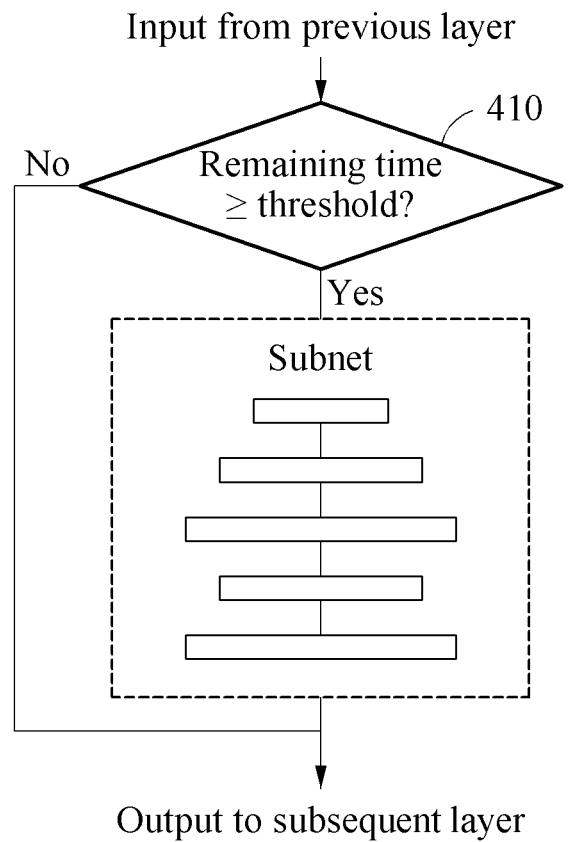
FIGS. 4, 5, and 6 illustrate an example of a skip operator.
Figure 5:
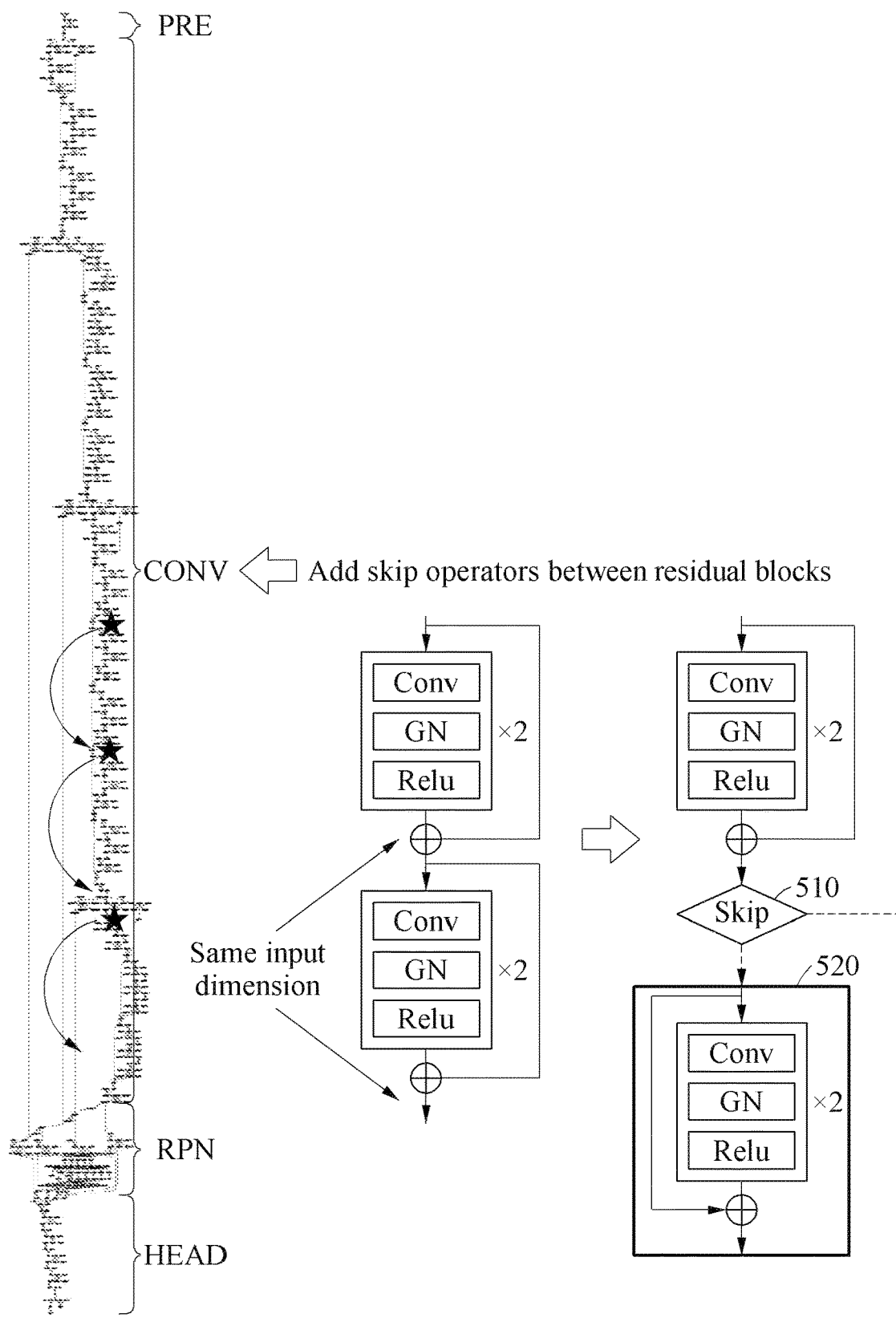
Figure 6:
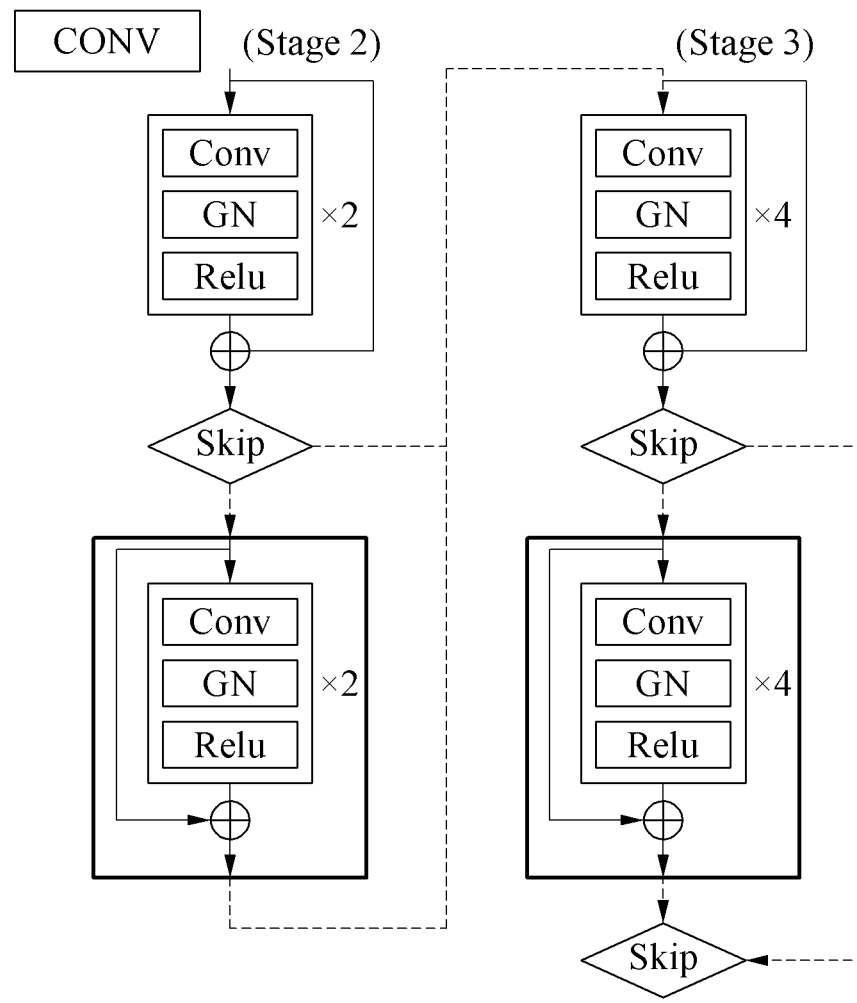

FIGS. 4 through 6 illustrate an example of a skip operator.

Referring to FIG. 4, a skip operator 410 may determine whether to execute a subnet based on a remaining time that is left up to a given deadline. The skip operator 410 may select a path for executing the subnet when there is a sufficient remaining time for executing a portion after a corresponding operator in a neural network, or otherwise, select a path for skipping the subnet without executing it.

The skip operator 410 may be added to a portion in which there is a pattern in which some layers are repeated or iterative according to the characteristic of a DNN architecture. For example, a plurality of residual blocks may be included in a CONV phase in an object detection network, and the residual blocks may have the same size of input data. When the size of the input data is the same, an additional layer may not be required to transmit data to a subsequent residual block even though one or more residual blocks are skipped through the skip operator 410. Thus, through the skip operator 410, it is possible to readily enable the expansion to a multi-path neural network.

For an operation performed by the skip operator 410 to select a path, a total execution time of the multi-path neural network may be represented by Equation 1.

$$t^T = t_{PRE}^T + t_{CONV}^T + t_{RPN}^T + t_{HEAD}^T \qquad \text{[Equation 1]}$$

In Equation 1, $t_{PRE}^T$, $t_{CONV}^T$, $t_{RPN}^T$, and $t_{HEAD}^T$ denote execution times of respective phases in the object detection network. Here, $t_{PRE}^T$ and $t_{RPN}^T$ may be network configurations that are changed rarely, and thus it may be assumed that $t_{PRE}^T$ and $t_{RPN}^T$ are consistent. In contrast, $t_{CONV}^T$ and $t_{HEAD}^T$ may be represented by Equation 2.

$$t_{CONV}^T \leq \sum_{i=1}^{n^{RS}} \{n_i^{RB} \cdot t_i^{RB}\} \qquad \text{[Equation 2]}$$

$$t_{HEAD}^T \leq \max\{t_j^{SN}(n_{max}^P)\}_{j \in [1, n^{SN}]}$$

In Equation 2, $n^{RS}$ denotes the number of residual stages in the CONV phase. $n_i^{RB}$ denotes the number of residual blocks in an i-th residual stage. $t_i^{RB}$ denotes an execution time of the residual blocks in the i-th residual stage. $t_j^{SN}(n)$ denotes an execution time of a j-th subnet in a HEAD phase when the number of region proposals determined in an RPN phase is n. $n_{max}^P$ denotes a maximum number of region proposals. $n^{SN}$ denotes the number of subnets in the HEAD phase.

Hereinafter, how each skip operator 410 included in the CONV phase determines whether to skip a residual block will be described first. For example, when a minimum execution time of a remaining portion corresponding to a portion after the skip operator 410 in the neural network exceeds a remaining time left to a deadline, the skip operator 410 may determine to skip a residual block. The minimum execution time of the remaining portion may be determined under the assumption that a skipping operation is performed in a skip operator included in the remaining portion and a subnet having the shortest execution time is executed in a switch operator. A threshold value $\mathcal{T}$ of the skip operator 410 in a k-th residual stage may be represented by Equation 3.

$$\mathcal{T} = n_k^{RB} \cdot t_k^{RB} + t_{RPN}^T + \min\ \{t_j^{SN}\ (n_{min}^P)\}_{j \in [1, n^{SN}]} \leq D - t_e \qquad \text{[Equation 3]}$$

In Equation 3, $n_k^{RB}$ denotes the number of residual blocks included in a k-th residual stage. $t_k^{RB}$ denotes an execution time of the residual blocks included in the k-th residual stage. $n_{min}^P$ denotes a minimum number of region proposals in the RPN phase. D denotes a deadline which is a time constraint by which an inference needs to be completed. $t_e$ denotes an elapsed time from when an inference of the neural network is started to when a corresponding operator is reached. $D - t_e$ denotes a remaining time that is left up to the deadline. When the threshold value $\mathcal{T}$ in Equation 3 that is determined by adding an execution time $t_{RPN}^T$ in the RPN phase and a minimum execution time $\min\{t_j^{SN}(n_{min}^P)\}_{j \in [1, n^{SN}]}$ in the HEAD phase to an execution time $n_k^{RS} \cdot t_k^{RS}$ of the k-th residual stage is less than or equal to the remaining time, the skip operator 410 may determine to execute the residual blocks included in the k-th residual stage. Conversely, when the threshold value $\mathcal{T}$ determined as described in the foregoing is greater than the remaining time, the skip operator 410 may determine to skip the residual blocks included in the k-th residual stage without executing them.

Referring to FIG. 5, a skip operator 510 may be added between residual blocks in a CONV phase. For example, a ResNet used for image classification may include a plurality of residual stages each including the same residual blocks. Since residual blocks of the same input size are iterated in a same residual stage, the skip operator 510 may be inserted between the residual blocks without an additional overhead. The skip operator 510 may determine whether to execute one or more iterative residual blocks 520. For example, in a case in which a switch operator (to be described hereinafter) is added in the CONV phase, an individual weight matrix for each subnet may need to be maintained. Thus, in terms of memory usage, the switch operator may be more effective than the skip operator 510 in the CONV phase. In addition, in a case in which a skip operator is added to a convolutional neural network (CNN) (e.g., VGGNet) in which an input size and an output size are different from each other, an additional layer may be needed to match the input size and the output size.

FIG. 6 illustrates an example of a skip operator added between one or more residual blocks included in each of residual stages included in a CONV phase.

Figure 7:
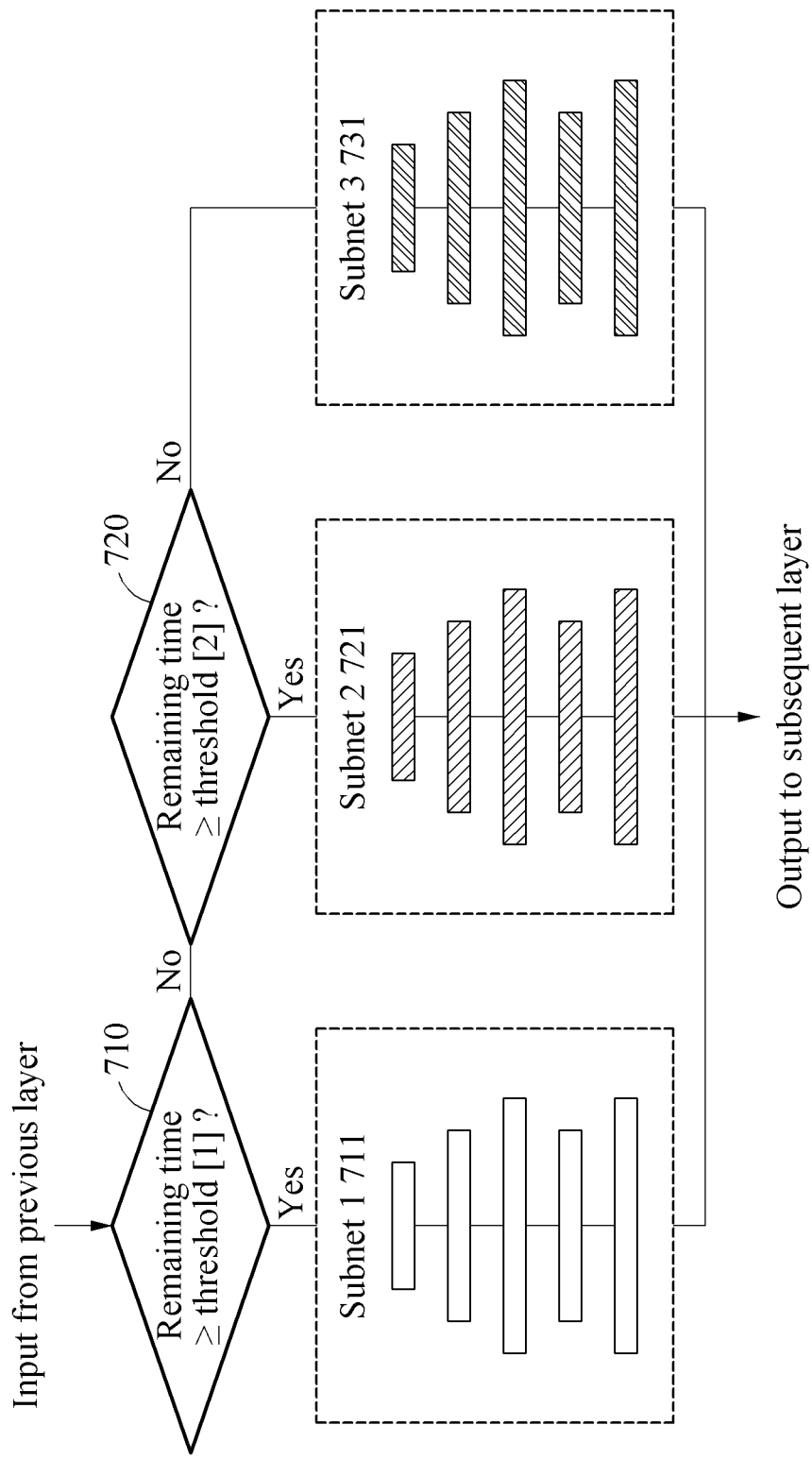
FIGS. 7 and 8 illustrate an example of a switch operator.
Figure 8:
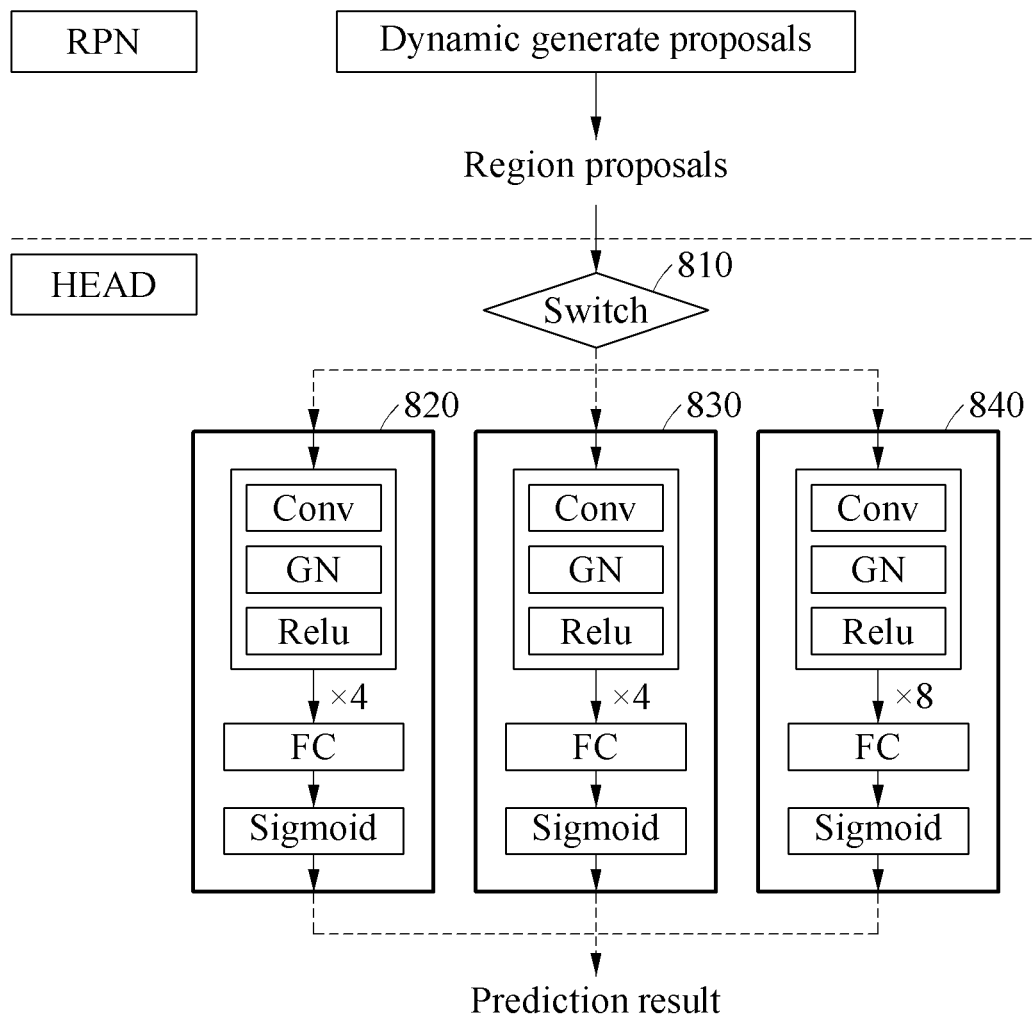

FIGS. 7 and 8 illustrate an example of a switch operator.

Referring to FIG. 7, a switch operator may determine a subnet to be executed among a plurality of subnets 711, 721, and 731 based on a remaining time that is left up to a given deadline. The switch operator may select a subnet having the longest execution time that is executable within the remaining time. The subnets 711, 721, and 731 may be arranged in an order of a long execution time. When whether conditions 710 and 720 of the switch operator are satisfied or not is verified in sequential order, the subnet having the longest execution time without exceeding the remaining time may be selected. In the example of FIG. 7, when the first subnet 711 is a subnet having the longest execution time among the subnets 711, 721, and 731, and the condition 710 of the switch operator that the remaining time is greater than or equal to a first threshold value is satisfied, the first subnet 711 may be executed. In other cases, when the second condition 720 of the switch operator that the remaining time is greater than or equal to a second threshold value is satisfied, the second subnet 721 may be executed, or otherwise, the third subnet 731 may be executed. In this example, the first threshold value may be an execution time of the first subnet 711, and the second threshold value may be an execution time of the second subnet 721. Although three subnets are illustrated in FIG. 7 for the convenience of description, a plurality of subnets may be included unconstrainedly.

For example, the switch operator may select a single subnet to be executed in a HEAD phase in an object detection network. The switch operator may select a subnet having the greatest execution time from among subnets each having an execution time less than or equal to a remaining time left to a deadline, which may be represented by Equation 4.

$$t_j^{SN} \leq D - t_e \qquad \text{[Equation 4]}$$

Referring to FIG. 8, an object detection network to which a switch operator 810 is added may include a plurality of multi-convolutional subnets 820, 830, and 840 in a HEAD phase. In general, the HEAD phase may include a shallower convolutional network than a CONV phase, and thus may include a plurality of subnets, for example, the subnets 820, 830, and 840. In addition, the HEAD phase may include one or more fully-connected layers that determine a final prediction result of the object detection network. For example, in a case in which different subnets, for example, the subnets 820, 830, and 840, share fully-connected layers, output prediction results from different execution paths may be contaminated, and training of the subnets 820, 830, and 840 may not be successfully performed. Thus, the subnets 820, 830, and 840 configured in dimensions of different numbers of convolution blocks and hidden layers may be separated.

Figure 9:
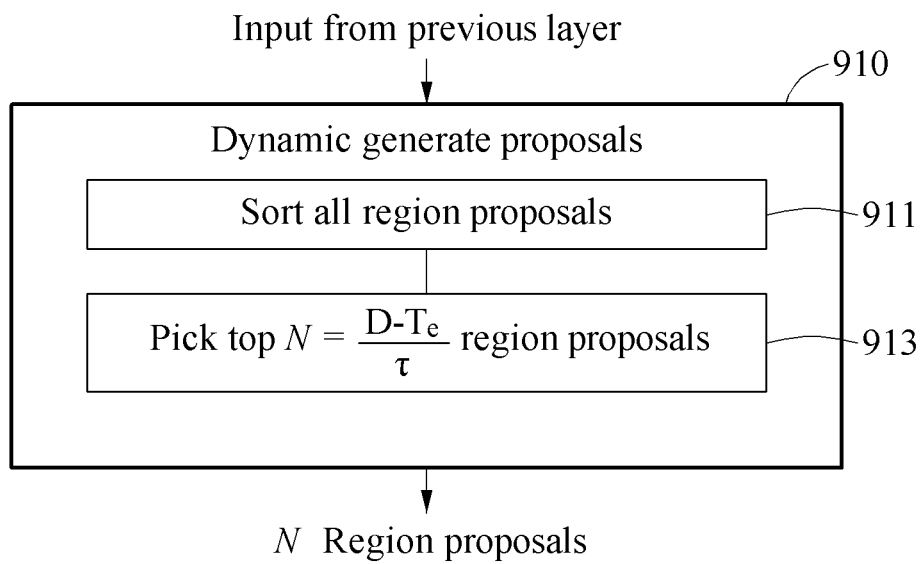
FIG. 9 illustrates an example of a dynamic generate proposal operator.

FIG. 9 illustrates an example of a dynamic generate proposal operator.

A dynamic generate proposal operator 910 may determine the number of region proposals to be predicted based on a remaining time left to a given deadline. An object detection network may include a region proposal network (or RPN) that predicts a region from which an object in an image is to be detected. To such a region proposal network, a multi-path operator that dynamically adjusts the number of region proposals based on a time constraint may be applied. Thus, it is possible to achieve real-time object detection.

Referring to FIG. 9, in operation 911, the dynamic generate proposal operator 910 extracts, as region proposals, all regions from which an object is predicted to be detected in an image.

In operation 913, the dynamic generate proposal operator 910 selects N region proposals from among the extracted region proposals based on a remaining time. The dynamic generate proposal operator 910 may dynamically change the number of region proposals that determines an input arrangement size in a HEAD phase. Here, for the dynamic generate proposal operator 910 to determine an appropriate number of region proposals, a threshold value $\mathcal{T}$ may be used. The threshold $\mathcal{T}$ may be an amount of time used to detect and classify an object in one region by a minimum path in the HEAD phase. The number of region proposals may be one of important factors that affect the accuracy in object detection. Thus, by assuming that a smallest subnet is executed in the HEAD phase, it is possible to maximize the number of region proposals through the dynamic generate proposal operator 910. The threshold value $\mathcal{T}$ may be represented by Equation 5.

$$\mathcal{T} = \min \{t_j^{SN}(n_{max}^P)\}_{j \in [1, n^{SN}]} \qquad \text{[Equation 5]}$$

The dynamic generate proposal operator 910 may transmit, to the HEAD phase, $n^P$ region proposals among all the region proposals extracted in operation 911.

The number $n^P$ of region proposals selected by the dynamic generate proposal operator 910 may be represented by Equation 6.

$$n^P = \min\left\{\max\left\{\left\lfloor n_{max}^P \cdot \frac{D - t_e}{\mathcal{T}} \right\rfloor, n_{min}^P\right\}, n_{max}^P\right\} \qquad \text{[Equation 6]}$$

Figure 10:
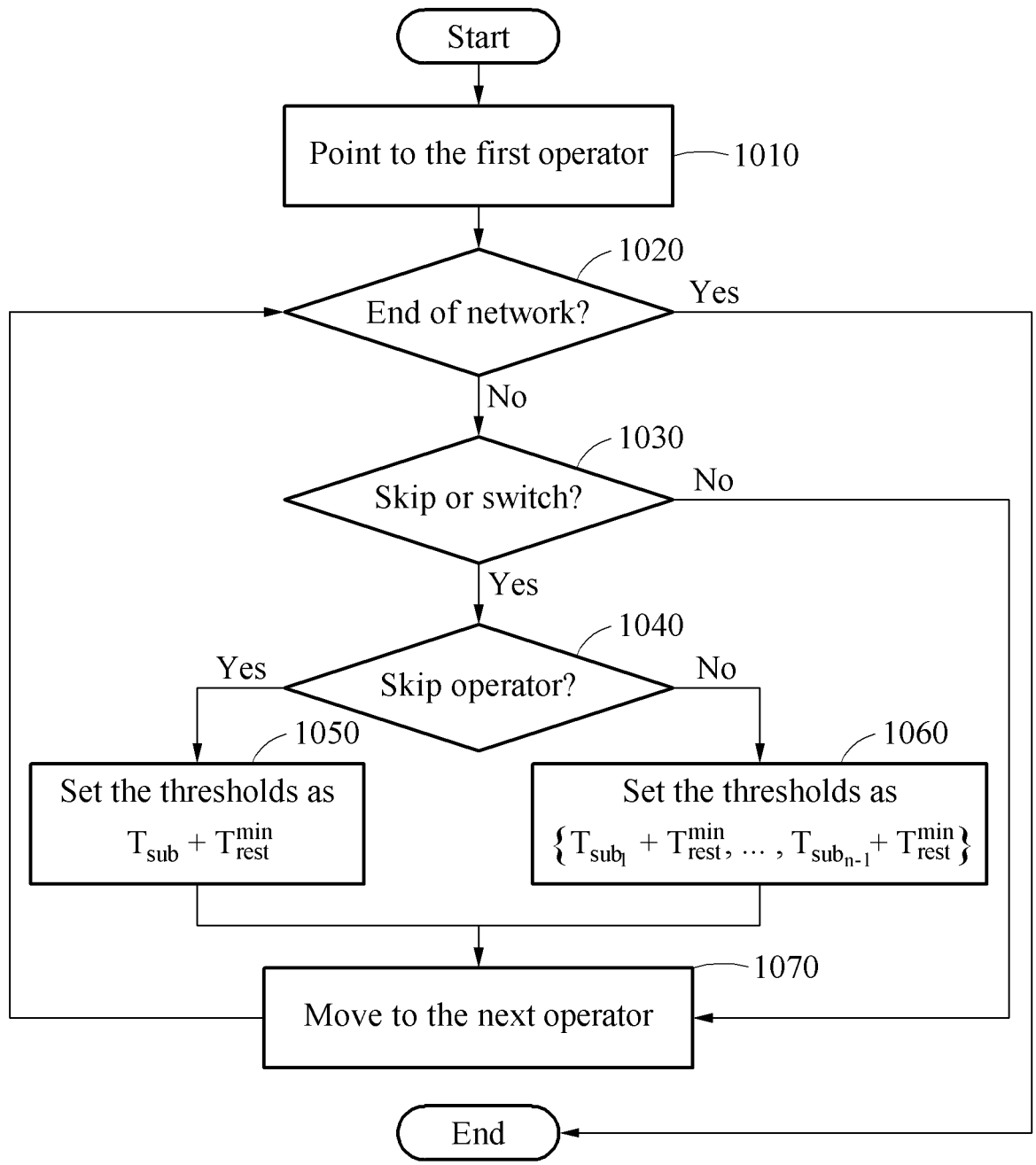
FIG. 10 illustrates an example of setting an operator added to a network.

FIG. 10 illustrates an example of setting an operator added to a network.

Hereinafter, setting each multi-path operator inserted in a neural network by a path decision module will be described with reference to FIG. 10. Based on features extracted from an image in layers of the neural network at an initial stage, an inference operation may be performed in subsequent layers. Thus, the layers at the initial stage may be important. The path decision module may sequentially set multi-path operators in the neural network. Through operations to be described hereinafter, it may be verified whether each operator, starting from a first operator in the neural network, is a multi-path operator or not, and then a threshold value needed for path decision may be set based on a type of a multi-path operator. The path decision module may also be referred to herein as a path decision model.

Referring to FIG. 1, in operation 1010, the path decision module indicates a first operator in a neural network.

In operation 1020, the path decision module verifies whether the currently indicated operator is a last portion of the neural network. When the operator is not the last portion, operation 1030 may be performed subsequently. Conversely, when the operator is the last portion, an operation of the path decision module may be terminated.

In operation 1030, the path decision module verifies whether the operator is a skip operator or a switch operator. When the operator is the skip or switch operator, operation 1040 may be performed subsequently. Conversely, when the operator is not the skip or switch operator, operation 1070 may be performed subsequently.

In operation 1040, the path decision module verifies whether the operator is the skip operator or not. When the operator is the skip operator, operation 1050 may be performed subsequently. Conversely, when the operator is not the skip operator, operation 1060 may be performed subsequently.

In operation 1050, the path decision module sets a threshold value of the skip operator as $T_{sub_i}, T_{rest}^{min}$. $T_{sub}$ denotes an execution time of a subnet when the skip operator selects a path for executing the subnet without selecting a skip path. $T_{rest}^{min}$ denotes a total execution time when a shortest path is selected from a remaining portion after the subnet in the neural network. Through this, the skip operator may determine whether to execute a subnet based on whether a time constraint is satisfied even though the shortest path is selected from the remaining portion.

In operation 1060, the path decision module sets a threshold value of the switch operator as $T_{sub_i}, T_{rest}^{min}$. Here, $T_{sub_i}$ denotes an execution time of an i-th subnet when the i-th subnet is selected in the switch operator. When the switch operator selects a single subnet to be executed from among n subnets, the switch operator may have n−1 threshold values. Through this, the switch operator may allow a subnet of a maximum executable size to be executed when a shortest path is selected from a remaining portion.

An execution time of the neural network to be used to set such a threshold value may be predicted based on various methods. For example, a worst-case execution time (WCET) prediction model that predicts an execution time using a graphics processing unit (GPU) may be used.

In operation 1070, the path decision module moves to a subsequent operator included in the neural network. Subsequently, operation 1020 may be performed again. The path decision module may set a threshold value of a multi-path operator included in a neural network as described above.

Figure 11:
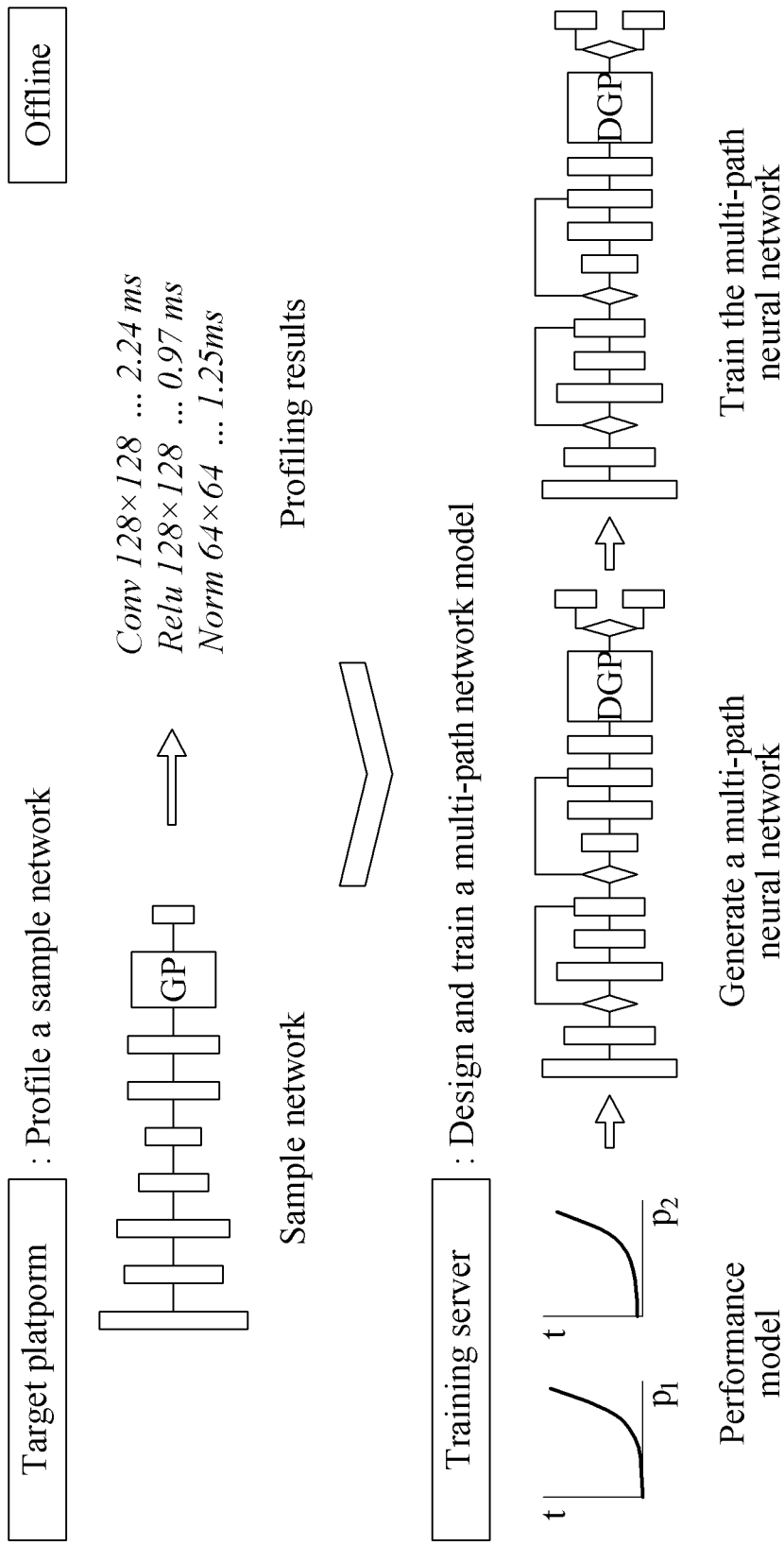
FIGS. 11, 12, and 13 illustrate examples of training a neural network to which a multi-path operator is applied.
Figure 12:
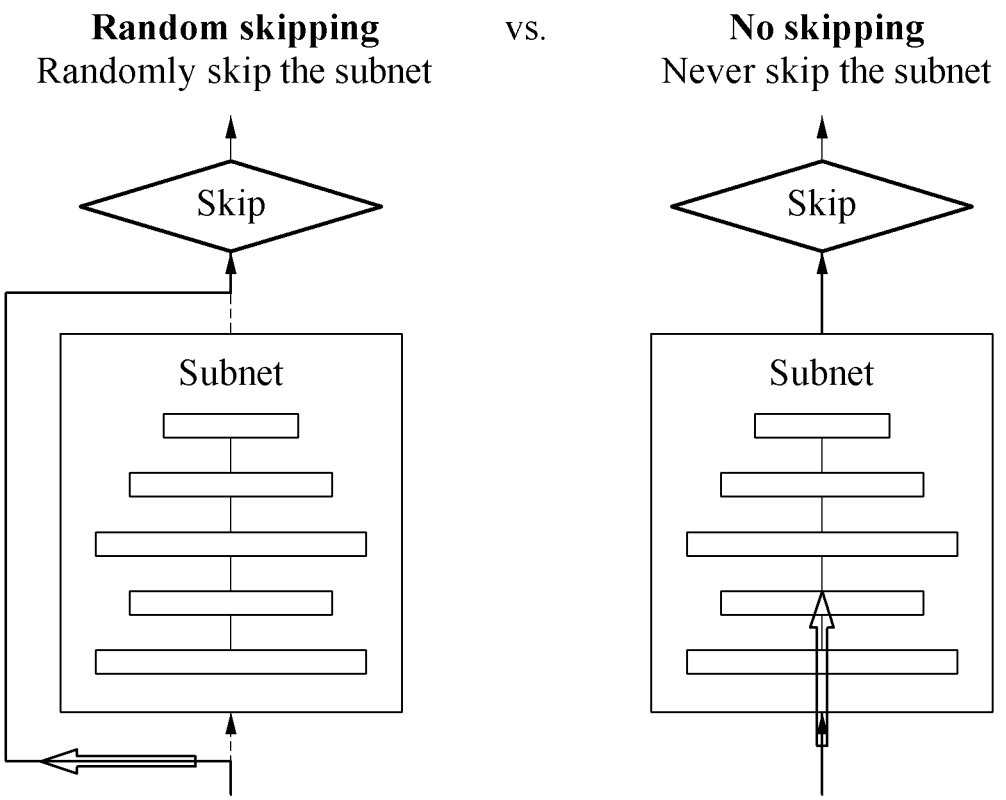
Figure 13:
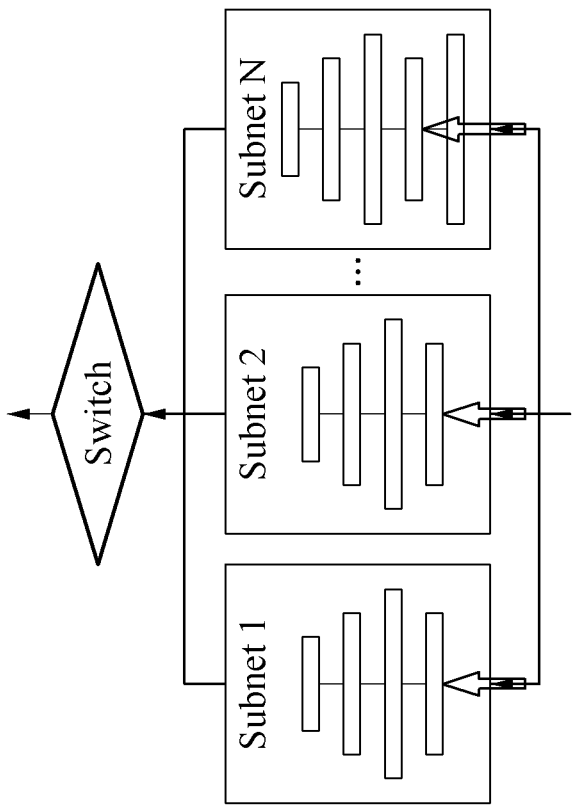
Figure 13:
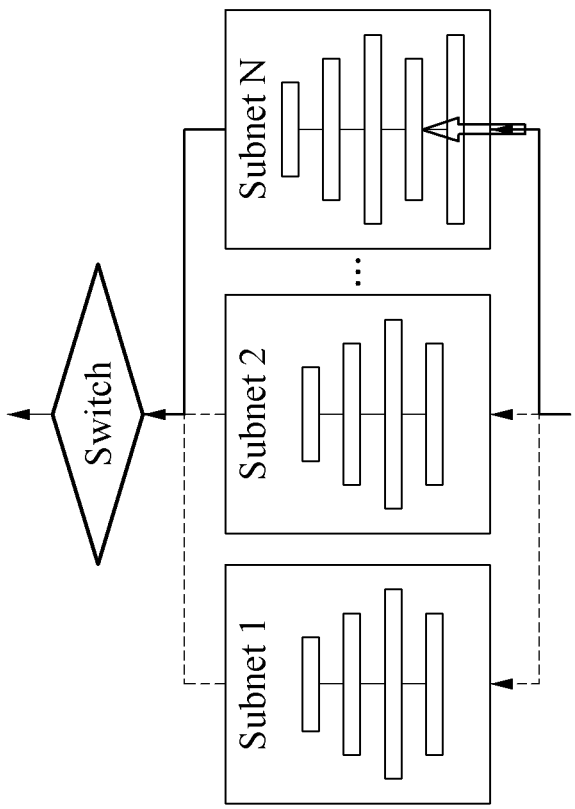

FIGS. 11 through 13 illustrate examples of training a neural network to which a multi-path operator is applied.

Referring to FIG. 11, for designing a multi-path neural network, profiling on a sample neural network may be performed first in a target platform. For example, the sample neural network may be an object detection network. A target GPU may execute the sample neural network several times, thereby relevant performance metrics such as a layer size and an execution cycle may be profiled.

Based on a result of the profiling, the multi-path operator may be inserted into the sample neural network, and thus a multi-path neural network may be obtained. By training the multi-path neural network, a potential loss of accuracy by the multi-path operator may be minimized. When the training is completed, the trained multi-path neural network may be transmitted to an inference device, and thus a real-time inference may be performed.

Unlike a static neural network in which a gradient is backpropagated in all paths all times, the multi-path neural network may have multiple paths through which a gradient is backpropagated. Here, the number of available paths may be great based on a network architecture (e.g., the number skip and switch operators). Thus, finding an effective training strategy may be one of important issues when using the multi-path neural network.

Referring to FIG. 12, regarding a backpropagation path of a skip operator, a random-skipping method through which a gradient is backpropagated by randomly determining whether to skip a subnet associated with the skip operator, and a no-skipping method through which a gradient backpropagated through a subnet without skipping the subnet may be used as a training strategy of the skip operator.

Referring to FIG. 13, regarding a backpropagation path of a switch operator, a random-switching method through which a gradient is backpropagated by randomly determining one of subnets associated with the switch operator, and a no-switching method through which a gradient is backpropagated through all the subnets may be used as a training strategy of the switch operator.

Referring back to FIG. 11, the following four may be used as a training strategy of a multi-path operator.

No-skipping and no-switching: a multi-path neural network may be trained by executing a subnet of each skip operator without skipping, and aggregating results of all subnets of each switch operator.

Random-skipping and no-switching: a multi-path neural network may be trained by randomly executing a subnet of each skip operator, and aggregating results of all subnets of each switch operator.

No-skipping and random-switching: a multi-path neural network may be trained by executing a subnet of each skip operator without skipping, and randomly executing one of subnets in each switch operator.

Random-skipping and random-switching: a multi-path neural network may be trained by randomly executing a subnet of each skip operator, and randomly executing one of subnets in each switch operator.

When randomly selecting an execution path, the multi-path neural network may randomly change a path (e.g., a pair of paths in forward and backward directions) for each iteration. That is, in the same iteration, the multi-path neural network may have an execution path that is fixed to prevent a gradient from being propagated through a wrong path.

Figure 14:
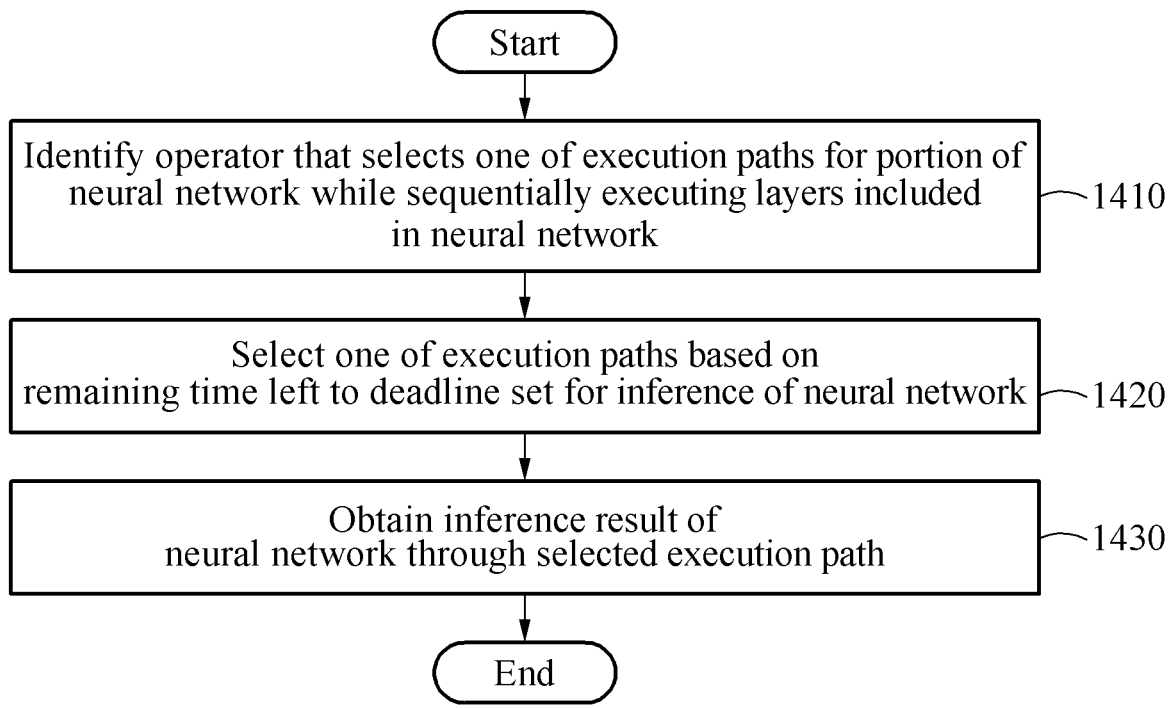
FIG. 14 illustrates an example of a data processing method.

FIG. 14 illustrates an example of a data processing method.

Hereinafter, a data processing method using a neural network that is executed by a processor included in a data processing apparatus will be described with reference to FIG. 14.

Referring to FIG. 14, in operation 1410, the data processing apparatus identifies an operator that selects one from among a plurality of execution paths for a portion of the neural network while sequentially executing layers included in the neural network. The operator may include a skip operator that determines whether to execute a subnet including one or more layers, and/or a switch operator that selects one of subnets each including one or more layers from among a plurality of subnets.

In operation 1420, the data processing apparatus selects one of the execution paths based on a remaining time left for an inference of the neural network. For example, the data processing apparatus may select one from among the execution paths based on a result obtained by comparing, to the remaining time, a minimum execution time of a remaining portion corresponding to a portion after the operator in the neural network.

The remaining time may refer to a time that is left by a deadline, which is determined based on the deadline and an elapsed time. Here, the deadline may be a time by which the inference of the neural network needs to be completed, and the elapsed time may be a time that is elapsed after the operator is executed until when the inference of the neural network is started. However, examples of which are not limited thereto. For example, the remaining time may include a time that is left by an intermediate reference time, which is determined based on the intermediate reference time and the elapsed time. Here, the intermediate reference time may be a time that is set in a portion of inference operations to be performed in the neural network. The intermediate reference time may refer to a time by which the portion of the inference operations performed in the neural network needs to be completed. The deadline set for the inference of the neural network may be set based on an environment (e.g., a speed of a vehicle) in which the neural network is executed.

In a case in which the operator is the skip operator, the data processing apparatus may select one from a path for executing a subnet and a path for skipping the subnet. When a sum of an execution time of the subnet and a minimum execution time after the subnet in the neural network is less than or equal to the remaining time, the data processing apparatus may select the path for executing the subnet. In a case in which the neural network includes iterative blocks each including one or more layers, the skip operator may be arranged between the blocks. For example, the skip operator may be arranged the between blocks having the same input size.

In a case in which the operator is the switch operator, the data processing apparatus may select one from among paths for executing respective subnets. For example, the data processing apparatus may select a path for executing a subnet having a greatest execution time among subnets each of which a sum of an execution time of each subnet and a minimum execution time after a corresponding subnet in the neural network is less than or equal to the remaining time.

In operation 1430, the data processing apparatus obtains a result of the inference of the neural network through the selected execution path.

In an example, the neural network may be a network that detects an object in an image. The data processing apparatus may extract, as region proposals, one or more regions in the image from which an object is predicted to be detected, and select n region proposals determined based on the remaining time from among the extracted region proposals. In this example, n denotes a natural number greater than 0, and less than a total number of the extracted region proposals.

The neural network may be trained based on backpropagation through a corresponding subnet without skipping in the skip operator included in the neural network or trained based on backpropagation through a corresponding plurality of subnets without switching of the switch operator included in the neural network. The neural network may be trained based on backpropagation by which skipping is randomly performed in the skip operator, and on backpropagation through a corresponding plurality of subnets without switching of the switch operator. The neural network may be trained based on backpropagation through a corresponding subnet without skipping in the skip operator and on backpropagation by which switching of the switch operator is randomly performed. Alternatively, the neural network may be trained based on backpropagation by which skipping in the skip operator is randomly performed and on backpropagation by which switching of the switch operator is randomly performed.

For a detailed description of the operations described above with reference to FIG. 14, reference may be made to what has been described above with reference to FIGS. 1 through 13, and thus a more detailed and repeated description will be omitted here for brevity.

Figure 15:
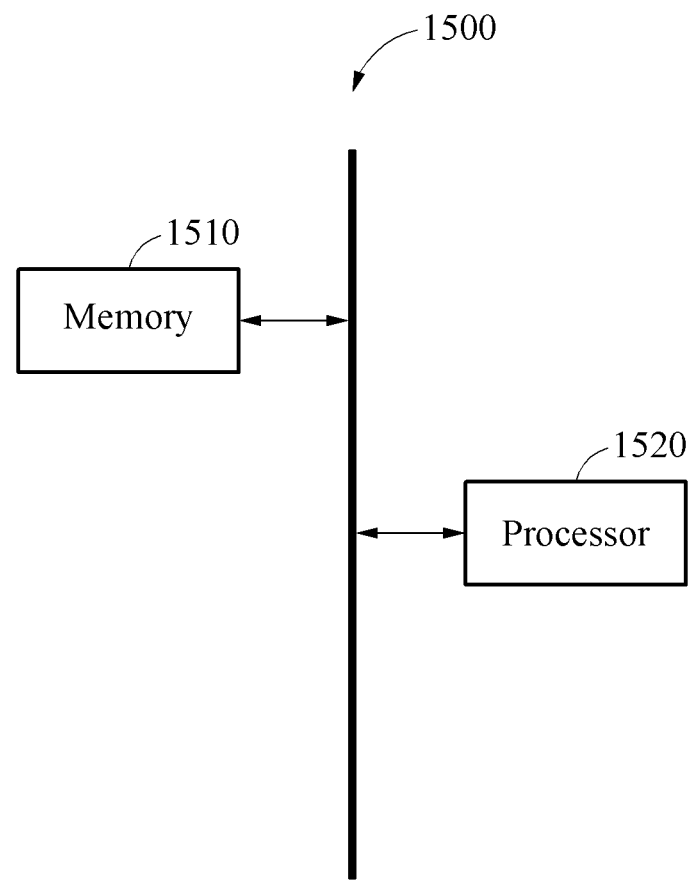
FIG. 15 illustrates an example of a data processing apparatus.

FIG. 15 illustrates an example of a data processing apparatus.

Referring to FIG. 15, a data processing apparatus 1500 includes a memory 1510 and a processor 1520. The memory 1510 and the processor 1520 may communicate with each other through a bus, a peripheral component interconnect express (PCIe), a network on a chip (NoC), and the like.

The data processing apparatus 1500 may be an artificial intelligence (AI) accelerator configured to execute a neural network and infer data to be input, and be a separate processor distinguished from a host processor to be described hereinafter. The data processing apparatus 1500 may be, for example, a neural processing unit (NPU), a GPU, a tensor processing unit (TPU), a digital signal processor (DSP), and the like. The data processing apparatus 1500 may process a workload that is more effectively processed by a separate dedicated processor, for example, the data processing apparatus 1500, than by the host processor used for general purposes based on the characteristics of operations of the neural network. The neural network described herein may also be referred to as a model for the convenience of description.

The memory 1510 may include a computer-readable instruction. When the instruction stored in the memory 1510 is executed in the processor 1520, the processor 1520 may perform the operations described above. The memory 1510 may be a volatile or non-volatile memory.

The processor 1520 may execute instructions or programs or control the data processing apparatus 1500. In an example, the processor 1520 may identify an operator that selects one of execution paths for a portion of the neural network while sequentially executing layers included in the neural network, select one of the execution paths based on a remaining time left to a deadline set for an inference of the neural network, and obtain a result of the inference of the neural network through the selected execution path.

The host processor may be a device configured to control respective operations of components (e.g., accelerator, host memory, etc.) included in an electronic device (not shown) and include a central processing unit (CPU), for example. The host processor may receive one or more requests for processing the neural network in an accelerator and generate an instruction that is executable in the accelerator in response to the received requests. A request described herein may be made for a neural network-based data inference, and made to obtain a result of the data inference by allowing the accelerator to execute the neural network for object recognition, pattern recognition, computer vision, speech recognition, machine translation, machine interpretation, recommendation services, personal customization services, image processing, autonomous driving, and the like. The instruction set may be generated in the host processor by executing the instruction set once in advance before the inference is performed in the accelerator, and executing the generated instruction set in the accelerator when the inference is actually requested by a user.

The electronic device may include, for example, a computing device such as a smartphone, a personal computer (PC), a tablet PC, a laptop, and a server, a wearable device such as a smart watch, smart eyeglasses, and smart clothes, a home appliance such as a smart speaker, a smart television (TV), and a smart refrigerator, and other devices such as a smart vehicle, a smart kiosk, an Internet of things (IoT) device, a walking assist device (WAD), a drone, a robot, and the like.

The example embodiments described herein may be used to develop an accelerator that supports a real-time inference by expanding an instruction set architecture (ISA) such that the accelerator dynamically changes an execution path for a given neural network in a step of designing the accelerator. In addition, they may be applicable to an autonomous (or self-driving) vehicle that needs real-time object detection. Further, they may be unconstrainedly applicable to various neural network-based systems that need a real-time inference.

In addition to what has been described above, the data processing apparatus 1500 may process the operations described herein.

The data processing apparatus, the electronic device, and other devices, apparatuses, units, modules, and components described herein with respect to FIG. 15 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented data processing method using a neural network to be executed by a processor, comprising:
    identifying which operator is added to subnets of the neural network, the operator configured to selects one of a plurality of execution paths for a portion of the neural network while sequentially executing layers included in the neural network;
    selecting, using the operator, a specific execution path, from among the plurality of execution paths, based on a remaining time left for an inference of the neural network; and
    performing the inference of the neural network through the specific execution path.

2. The data processing method of claim 1, wherein the selecting comprises:
    selecting the specific execution path based on a result of comparing, to the remaining time, a minimum execution time of a remaining portion of the neural network after the operator.

3. The data processing method of claim 1, wherein the remaining time includes:
    a remaining time that is left to a deadline, which is determined based on the deadline and an elapsed time, wherein the deadline is a time by which the inference of the neural network needs to be completed, and the elapsed time is a time elapsed after the inference of the neural network is started until when the operator is executed; or
    a remaining time that is left to an intermediate reference time, which is determined based on the intermediate reference time and the elapsed time, wherein the intermediate reference time is set for a portion of inference operations performed in the neural network.

4. The data processing method of claim 1, wherein the operator is a skip operator configured to determine whether to execute a subnet including one or more layers,
    wherein the selecting comprises:
    selecting the specific execution path from among a path for executing the subnet and a path for skipping the subnet.

5. The data processing method of claim 4, wherein the selecting comprises:
    when a sum of an execution time of the subnet and a minimum execution time of the neural network after the subnet is less than or equal to the remaining time, selecting the path for executing the subnet.

6. The data processing method of claim 4, wherein the neural network includes iterative blocks, and
    wherein the skip operator is arranged between the blocks.

7. The data processing method of claim 6, wherein the skip operator is arranged between blocks having a same input size.

8. The data processing method of claim 1, wherein the operator is a switch operator configured to select a subnet to be executed from among a plurality of subnets each including one or more layers,
    wherein the selecting comprises:
    selecting the specific execution path from among paths that respectively execute the subnets.

9. The data processing method of claim 8, wherein the selecting comprises:
    selecting a path for executing a subnet having a greatest execution time among subnets for which a sum of an execution time of the respective subnet and a minimum execution time after a corresponding subnet in the neural network is less than or equal to the remaining time.

10. The data processing method of claim 9, wherein the selecting comprises:
    selecting the path for executing the subnet having the greatest execution time that is executable within the remaining time by determining whether a remaining portion of the neural network including subnets in sequential order of a greatest execution time among the subnets is executable within the remaining time.

11. The data processing method of claim 1, wherein the neural network is a network that detects an object in an image.

12. The data processing method of claim 11, further comprising:
    extracting, as region proposals, one or more regions from which an object is predicted to be detected in the image; and
    selecting n region proposals from among the extracted regions based on the remaining time,
    wherein n is a natural number greater than 0 and less than a total number of the extracted region proposals.

13. The data processing method of claim 12, wherein n is determined based on a minimum time for detecting and classifying an object in each of the n region proposals and on the remaining time.

14. The data processing method of claim 1, wherein a deadline set for the inference of the neural network is set based on an environment in which the neural network is executed.

15. The data processing method of claim 1, wherein the neural network is trained based on backpropagation through a corresponding subnet without skipping in a skip operator included in the neural network and on backpropagation through a corresponding plurality of subnets without switching of a switch operator included in the neural network;
    trained based on backpropagation through which skipping is randomly performed in the skip operator and on backpropagation through a corresponding plurality of subnets without switching of the switch operator;
    trained based on backpropagation through a corresponding subnet without skipping in the skip operator and on backpropagation through which switching of the switch operator is randomly performed; or trained based on backpropagation through which skipping is randomly performed in the skip operator and on backpropagation through which switching of the switch operator is randomly performed.

16. A non-transitory computer-readable storage medium storing commands that, when executed by a processor, cause the processor to perform the data processing method of claim 1.

17. A data processing apparatus using a neural network, comprising:
at least one processor,
wherein the processor is configured to:
identify which operator is added to subnets of the neural network, the operator configured to selects one of a plurality of execution paths for a portion of the neural network while sequentially executing layers included in the neural network;
select, using the operator, a specific execution path, from among the execution paths, based on a remaining time for an inference of the neural network; and
perform the inference of the neural network through the specific execution path.

18. The data processing apparatus of claim 17, wherein the processor is configured to:
selecting the specific execution path based on a result of comparing, to the remaining time, a minimum execution time of a remaining portion of the neural network after the operator.

19. The data processing apparatus of claim 17, wherein the remaining time includes:
a remaining time that is left to a deadline, which is determined based on the deadline and an elapsed time, wherein the deadline is a time by which the inference of the neural network needs to be completed, and the elapsed time is a time elapsed after the inference of the neural network is started until when the operator is executed; or
a remaining time that is left to an intermediate reference time, which is determined based on the intermediate reference time and the elapsed time, wherein the intermediate reference time is set for a portion of inference operations performed in the neural network.

20. An electronic device comprising:
a host processor configured to transmit, to an accelerator, an instruction for a neural network-based model to be executed in the accelerator in response to a request for executing the neural network-based model in the accelerator being received; and
the accelerator configured to execute the neural network-based model based on the instruction,
wherein the accelerator is configured to:
identify which operator is added to subnets of the neural network-based model, the operator configured to selects one of a plurality of execution paths for a portion of the neural network-based model while sequentially executing layers included in the neural network-based model;
select, using the operator, a specific execution path, from among the plurality of execution paths, based on a remaining time for an inference of the neural network-based model; and
perform the inference of the neural network-based model through the specific execution path.

21. A processor-implemented method, comprising:
determining an amount of time remaining until an inference of a neural network;
identifying which operator is added to subnets of the neural network;
selecting, using the operator, a specific execution path of the neural network, from among a first execution path of the neural network that includes execution of a specific subnet and a second execution path of the neural network that excludes execution of the specific subnet, based on the amount of time remaining; and
performing the inference of the neural network through the specific execution path.

22. The method of claim 21, further comprising:
determining an amount of time required to execute the specific subnet;
in a case in which the amount of time required to execute the specific subnet is greater than the amount of time remaining, selecting the second execution path as the specific execution path; and
in a case in which the amount of time required to execute the specific subnet is less than or equal to the amount of time remaining, selecting the first execution path as the specific execution path.

23. An apparatus comprising:
one or more processors configured to execute the method of claim 21.

* * * * *